(12) United States Patent
Calta et al.

(10) Patent No.: US 11,661,375 B2
(45) Date of Patent: May 30, 2023

(54) APPLYING PROTECTIVE COATINGS TO OPTICAL FIBERS

(71) Applicant: LAWRENCE LIVERMORE NATIONAL SECURITY, LLC, Livermore, CA (US)

(72) Inventors: Nicholas P. Calta, Oakland, CA (US); Michael J. Messerly, Danville, CA (US); Corie A. Horwood, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/240,083

(22) Filed: Apr. 26, 2021

(65) Prior Publication Data

US 2021/0363055 A1  Nov. 25, 2021

Related U.S. Application Data

(60) Provisional application No. 63/027,685, filed on May 20, 2020.

(51) Int. Cl.
| | |
|---|---|
| *C03B 37/025* | (2006.01) |
| *C03C 25/10* | (2018.01) |
| *C03C 25/1065* | (2018.01) |
| *C03C 25/106* | (2018.01) |
| *C03C 25/105* | (2018.01) |

(52) U.S. Cl.
CPC ......... *C03C 25/109* (2013.01); *C03B 37/025* (2013.01); *C03C 25/105* (2013.01); *C03C 25/1063* (2018.01); *C03C 2217/78* (2013.01)

(58) Field of Classification Search
None
See application file for complete search history.

(56) References Cited

U.S. PATENT DOCUMENTS

| | | | |
|---|---|---|---|
| 4,096,823 A | 6/1978 | Schladitz | |
| 4,390,589 A | 6/1983 | Geyling et al. | |
| 4,474,830 A | 10/1984 | Taylor | |
| 4,530,750 A | 7/1985 | Aisenberg et al. | |
| 4,609,437 A | 9/1986 | Kruishoop et al. | |
| 4,673,427 A | 6/1987 | Van Der Giessen et al. | |
| 5,093,880 A | 3/1992 | Matsuda et al. | |

(Continued)

FOREIGN PATENT DOCUMENTS

| | | | | |
|---|---|---|---|---|
| CN | 107082582 A | * | 8/2017 | ............. C03C 25/28 |
| JP | H07309640 A | * | 5/1994 | |

(Continued)

OTHER PUBLICATIONS

Translation of JP 2003-295010 (Year: 2003).*

(Continued)

*Primary Examiner* — Cynthia Szewczyk
(74) *Attorney, Agent, or Firm* — Eddie E. Scott

(57) ABSTRACT

Apparatus, systems, and methods that provide coats on a glass optical fiber including of an inner layer and an outer layer. The method includes two steps. First, a conductive polymer coating is applied to the optical fiber as it is being produced. Second, a protective coating is applied to that conductive polymer coating. The conductive polymer coating is applied immediately after the fiber is drawn from preform to fiber.

2 Claims, 3 Drawing Sheets

(56) References Cited

U.S. PATENT DOCUMENTS 5,974,837 A * 11/1999 Abbott, III .............. C03C 25/18
                                                                65/432
6,798,963 B2     9/2004 Nemirovsky et al.

FOREIGN PATENT DOCUMENTS

| JP | 2003-295010 A | 10/2003 |
| JP | 2003-342043 A | 12/2003 |
| JP | 2009-251376 A | 10/2009 |
| KR | 10-2015-0102809 A | 9/2015 |

OTHER PUBLICATIONS

Translation of KR 2015-1012809 (Year: 2015).*
Dini et al., "Electrodeposition of Copper," Modern Electroplating; John Wiley & Sons, 2011, pp. 33-78.
Ritzdorf, "Manufacturing Tools", Modern Electroplating; John Wiley & Sons, 2011, pp. 513-526.
Snyder, "Preparation for Deposition", Modern Electroplating; John Wiley & Sons, 2011, pp. 507-512.
Schlesinger et al., "Fundamental Considerations", Modern Electroplating; John Wiley & Sons, 2011, pp. 1-32.
International Search Report and Written Opinion for PCT/US2021/030164 corresponding to U.S. Appl. No. 17/240,083, 9 pages.

* cited by examiner

APPLYING PROTECTIVE COATINGS TO OPTICAL FIBERS

CROSS-REFERENCE TO RELATED APPLICATIONS

This application claims priority to and benefit under 35 U.S.C. § 119(e) of U.S. Provisional Patent Application No. 63/027,685 filed May 20, 2020 entitled "applying metal coatings to optical fibers via a conductive polymer coating followed by a metal coating," the content of which is hereby incorporated by reference in its entirety for all purposes.

STATEMENT AS TO RIGHTS TO APPLICATIONS MADE UNDER FEDERALLY SPONSORED RESEARCH AND DEVELOPMENT

This invention was made with Government support under Contract No. DE-AC52-07NA27344 awarded by the United States Department of Energy. The Government has certain rights in the invention.

BACKGROUND

Field of Endeavor

The present application relates to optical fibers and more particularly applying protective coatings to optical fibers including a conductive polymer coating and another coating.

State of Technology

This section provides background information related to the present disclosure which is not necessarily prior art.

Scratches to optical fibers drastically reduce their mechanical strength, so optical fibers are encased in some form of protective coating to prevent scratching. These coatings are typically organic polymers. These polymer coatings are typically applied in line during fiber production, immediately after a glass preform is drawn into a fiber. This is accomplished by pulling the fiber through a liquid monomer solution, which adheres to the fiber and is then cured either by exposure to UV light or heat. While these coatings are robust in benign environments, they degrade at elevated temperatures and are unstable in many corrosive environments. Furthermore, they are thermally insulating, which can lead to challenges in situations where control of fiber temperature by either active heating or cooling is important.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's apparatus, systems, and methods provide a multi-layer coating on a glass optical fiber consisting of an inner conductive polymer layer and at least one outer protective layer. The inventor's apparatus, systems, and methods have use by manufacturers of components for fiber-interfaced packages and optical fiber fabricators.

In various embodiments the inventor's apparatus, systems, and methods include two major steps. First, a conductive polymer coating is applied to the optical fiber as it is being produced. Second, a protective coating is applied to that conductive polymer coating. In other embodiments additional layers, including metal layers, are applied. The conductive polymer coating is applied immediately after the fiber is drawn from preform to fiber.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
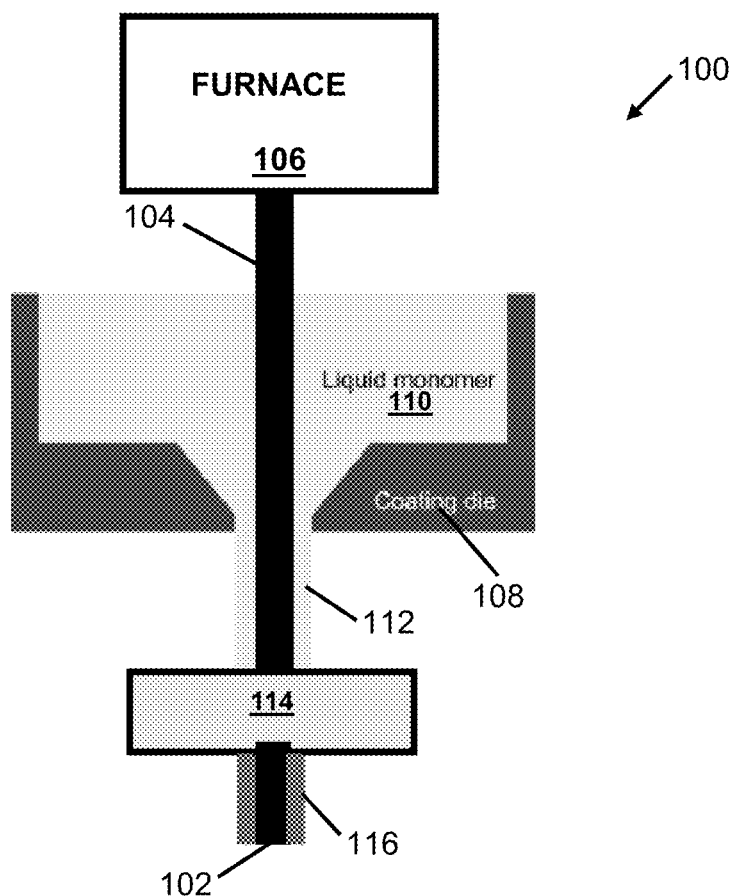
FIG. 1 illustrates one embodiment of the inventor's apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, Referring to the drawings and in particular to FIG. 1, one embodiment of the inventor's apparatus, systems, and methods is illustrated. This embodiment is designated generally by the reference numeral 100. The embodiment 100 includes the structural elements identified and described below.

Reference numeral 102—Fiber with conductive polymer coating,

Reference numeral 104—Fiber,

Reference numeral 106—Furnace,

Reference numeral 108—Coating die,

Reference numeral 110—Liquid monomer/liquid suspension,

Reference numeral 112—Liquid monomer coated on fiber,

Reference numeral 114—Bank of UV lamps or Furnace, and

Reference numeral 116—Polymerized/consolidated coating.

The structural elements of the system 100 having been identified and described the operation of the system 100 will now be considered. First, the starting preform glass (not shown) is drawn to a fiber 104 by passing it through a furnace 106 under tension on a draw tower. Below the furnace 106 sits a coating die 108 filled with a liquid monomer 110. In an alternative embodiment the coating die 108 is filled with a liquid suspension of the desired conductive polymer. The fiber 104 is drawn through this die 108, leaving a coating 112 of the liquid monomer (or suspension) 110 on the fiber 102. The coating 112 is then polymerized/consolidated by passing it through a bank of UV lamps or furnace 114, producing a continuous coating of conducting polymer 116. In another embodiment the coating 116 is polymerized/consolidated by passing through a f a bank of UV lamps or furnace 114. This results in a length of optical fiber 102 coated with a protective coating 116.

Figure 2:
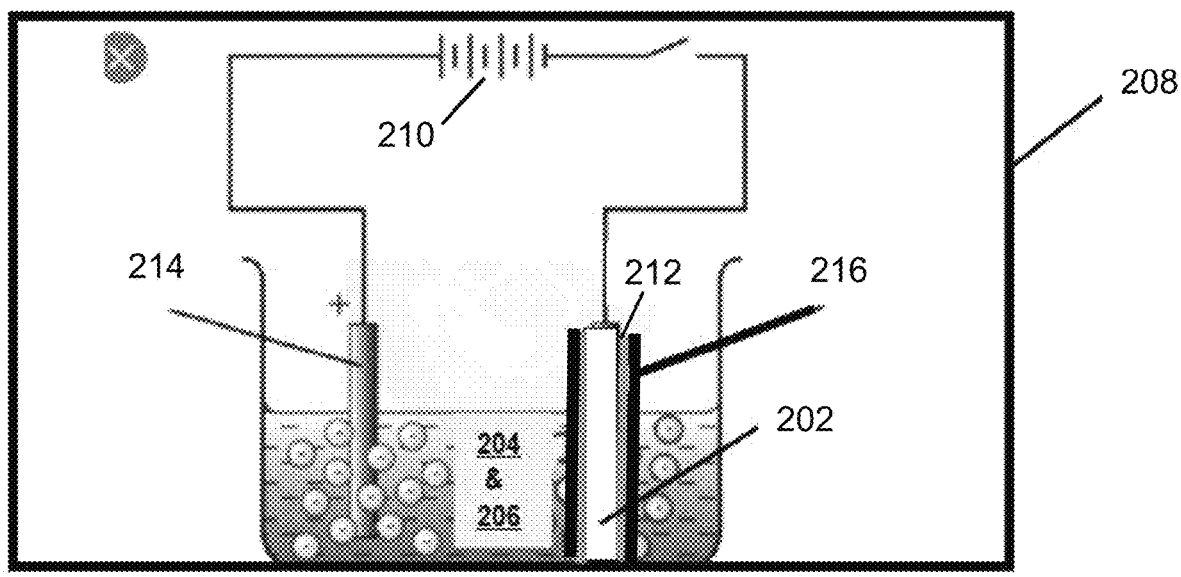
FIG. 2 provides further details of the inventor's apparatus, systems, and methods 100 illustrated in FIG. 1.

FIG. 2 provides further details of the inventor's apparatus, systems, and methods 100 illustrated in FIG. 1. FIG. 2 is a schematic depiction illustrating further details of the inventor's apparatus, systems, and methods 100. FIG. 2 includes the structural elements identified and described below.

Reference numeral 202—Fiber,
Reference numeral 204—Metal salt,
Reference numeral 206—Aqueous solution,
Reference numeral 208—Electroplating chamber,
Reference numeral 210—Power supply,
Reference numeral 212—conductive polymer coating,
Reference numeral 214—Counter electrode (anode), and
Reference numeral 216—Metal coating.

The structural elements of the inventor's apparatus and, systems having been identified and described, the operation of the inventor's apparatus, systems, and methods will now be considered. A polymer coating 212 is applied to the fiber 202. An outer metal coating is then applied to the conductive polymer coating. This is accomplished using an electroplating chamber 208. A metal salt 204 is dissolved in an aqueous solution 206, and the fiber 202 is inserted into the solution 206. The choice of metal salt or multiple metal salts determines the composition of the metal coating, and other electroplating parameters such as supporting electrolytes and additives determine the morphology of the coating. The electroplating setup consists of a power supply 210, a counter electrode (anode) 214, and a voltage applied between the counter electrode 214 and the polymer-coated fiber 202. The voltage causes reduction of the metal ions on the surface of the conductive polymer coating 212, plating a metal coating 216 on the outside of the fiber 202. The voltage can be applied because the conductive polymer coating 212 of the fiber 202 is sufficiently conductive to act as an electrode in the electroplating solution. An embodiment of the electroplated metal 216 illustrated in FIG. 2 is copper. Another embodiment of the electroplated metal 216 is gold. Yet another embodiment of the electroplated metal 216 is silver. Still another embodiment of the electroplated metal 216 is nickel. Another embodiment of the electroplated metal 216 is tin. Another embodiment of the electroplated metal 216 is chromium. In various other embodiments the electroplated metal 216 is other metals and alloys. This plating step can be done either by submerging the entire fiber at once or by drawing the fiber through the plating solution, either in-line with the entire fabrication process or after the tower draw as a separate step. Electroplating is a relatively fast deposition process, with deposition rates on the order of a micrometer per minute. Due to the metal coating thickness required for the fiber 202, i.e., tens of micrometers, very short electroplating times are required.

Figure 3:
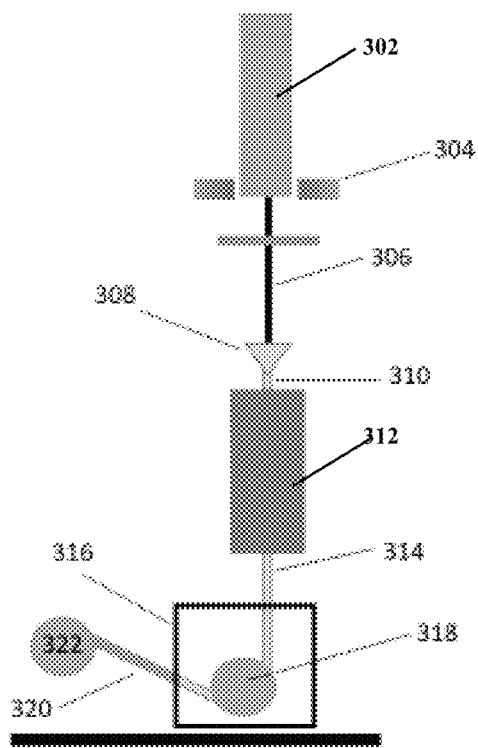
FIG. 3 illustrates another embodiment of the inventor's apparatus, systems, and methods.

Referring to FIG. 3, another embodiment of the inventor's apparatus, systems, and methods is illustrated. This embodiment is designated generally by the reference numeral 300. The embodiment 300 includes the structural elements identified and described below.

Reference numeral 302—Preform glass,
Reference numeral 304—Furnace
Reference numeral 306—Uncoated Fiber
Reference numeral 308—Coating die filled with liquid monomer (additional embodiment a polymer suspension)
Reference numeral 310—Coating of liquid monomer on the surface of the fiber
Reference numeral 312—Furnace or UV lamps
Reference numeral 314—Fiber coated with conducting polymer
Reference numeral 316—Electroplating chamber
Reference numeral 318—fiber pulling apparatus
Reference numeral 320—metal coated optical fiber
Reference numeral 322—spool of coated fiber The structural elements of the embodiment of the inventor's apparatus, systems, and methods 300 having been identified and described the operation of the embodiment 300 will now be considered. First, the starting preform glass 302 is drawn to a fiber 306 by passing it through a furnace 304 under tension from a fiber pulling mechanism 318 in a draw tower. Below the furnace 304 sits a coating die 308 filled with a liquid monomer. In another embodiment the coating die 308 is filled with a liquid suspension of the desired conductive polymer. The fiber 306 is drawn through this die 308, leaving a coating 310 of the liquid monomer (or suspension) on the fiber 306. The coating 310 is then polymerized/consolidated by passing through a bank of UV lamps 312. In another embodiment the coating 310 is polymerized/consolidated by passing through a furnace 312. This results in the optical fiber 302 being coated with a conductive polymer protective coating 314. This coated fiber then enters an electroplating chamber 316 similar to the one described in FIG. 2. In this chamber, the fiber is passed through a metal salt solution (not shown) and a metal coating is deposited on the fiber. The metal- and conductive polymer-coated fiber 320 is removed from the electroplating chamber and collected on a spool 322.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for making an optical fiber, comprising:
a starting preform glass,
a fiber draw tower for drawing said starting preform glass into a fiber,
a first furnace that receives said starting preform glass and produces said fiber,
a coating die located below said first furnace,
a liquid suspension of a conductive polymer within said coating die wherein said fiber is drawn through said coating die and said liquid suspension of a conductive polymer leaving said conductive polymer as a coating on said fiber,
a second furnace wherein said fiber with said conductive polymer as a coating is drawn into said second furnace and polymerized by said second furnace resulting in in said fiber being coated with a conductive polymer protective coating, and
an electroplating chamber containing a metal salt dissolved in an aqueous solution wherein said fiber coated with a conductive polymer protective coating is inserted into said electroplating chamber resulting in said fiber coated with a conductive polymer protective coating being coated with a metal coating.

2. An apparatus for making an optical fiber, comprising:
a starting preform glass,
a fiber draw tower for drawing said starting preform glass into a fiber,
a furnace that receives said starting preform glass and produces said fiber,
a coating die containing a liquid suspension of a conductive polymer wherein said fiber is drawn through said coating die leaving said conductive polymer as a coating on said fiber,
a bank of ultraviolet lamps wherein said fiber with said conductive polymer as a coating is drawn into said ultraviolet lamps and polymerized by said ultraviolet lamps and results in said fiber being coated with a conductive polymer protective coating, and
an electroplating chamber containing a metal salt dissolved in an aqueous solution wherein said fiber coated with a conductive polymer protective coating is inserted into said electroplating chamber resulting in said fiber coated with a conductive polymer protective coating being coated with a metal coating.

\* \* \* \* \*